(12) United States Patent
Ellerby et al.

(10) Patent No.: US 11,507,512 B2
(45) Date of Patent: Nov. 22, 2022

(54) FAULT TOLERANT CLUSTER DATA HANDLING

(71) Applicant: EMC IP Holding Company LLC, Hopkinton, MA (US)

(72) Inventors: Ben Ellerby, Bainbridge Island, WA (US); Austin Voecks, Bainbridge, WA (US); Evgeny Popovich, Port Coquitlam (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 177 days.

(21) Appl. No.: 17/114,804

(22) Filed: Dec. 8, 2020

(65) Prior Publication Data
US 2022/0179790 A1    Jun. 9, 2022

(51) Int. Cl.
*G06F 12/0815* (2016.01)
*G06F 12/123* (2016.01)

(52) U.S. Cl.
CPC ........ *G06F 12/0815* (2013.01); *G06F 12/124* (2013.01); *G06F 2212/1032* (2013.01); *G06F 2212/608* (2013.01)

(58) Field of Classification Search
CPC ....................................................... G06F 3/06
See application file for complete search history.

(56) References Cited

U.S. PATENT DOCUMENTS

| 5,918,229 | A | * | 6/1999 | Davis | G06F 16/9574 |
| | | | | | 711/E12.066 |
| 9,977,760 | B1 | * | 5/2018 | Diehl | G06F 16/13 |
| 2008/0071983 | A1 | * | 3/2008 | Kamei | G06F 12/0873 |
| | | | | | 711/E12.019 |
| 2008/0307158 | A1 | * | 12/2008 | Sinclair | G06F 12/0246 |
| | | | | | 711/E12.008 |
| 2011/0161370 | A1 | * | 6/2011 | Miyamae | G06F 16/10 |
| | | | | | 707/E17.143 |

(Continued)

OTHER PUBLICATIONS

"Header Field Definitions," https://www.w3.org/Protocols/rfc2616/rfc2616-sec14.html#sec14.35, 51 pages.

(Continued)

*Primary Examiner* — William E. Baughman
(74) *Attorney, Agent, or Firm* — Amin, Turocy & Watson, LLP

(57) ABSTRACT

The described technology is generally directed towards fault tolerant cluster data handling techniques, as well as devices and computer readable media configured to perform the disclosed fault tolerant cluster data handling techniques. Nodes in a computing cluster can be configured to generate wire format resources corresponding to operating system resources. A wire format resource can comprise a cache key and a hint information to locate data, such as a file, corresponding to the operating system resource. The wire format resource can be stored in a resource cache along with a pointer that points to the operating system resource. The wire format resource can also be provided to client devices. Nodes in the computing cluster can be configured to receive and process client instructions that include wire format resources, as well as to use hint information to re-allocate data associated with a wire format resource.

20 Claims, 11 Drawing Sheets

(56) References Cited

U.S. PATENT DOCUMENTS

| | | | |
|---|---|---|---|
| 2012/0151249 A1* | 6/2012 | Swan | G06F 11/1443 |
| | | | 714/4.11 |
| 2013/0066941 A1* | 3/2013 | Kruse | H04L 69/40 |
| | | | 709/203 |
| 2014/0189004 A1* | 7/2014 | Aahlad | H04L 67/10 |
| | | | 709/204 |
| 2016/0203053 A1* | 7/2016 | Talagala | G06F 3/0653 |
| | | | 714/6.12 |

OTHER PUBLICATIONS

"Remote Procedure Call," https://en.wikipedia.org/wiki/Remote_procedure_call, 5 pages.

* cited by examiner

From FIG. 7A, 8

722 — after sending the wire format resource to the client, receiving, by the server, a subsequent remote procedure call from the client, the subsequent remote procedure call comprising the wire format resource and file modification information

724 — using, by the server, the cache key from the wire format resource included in the subsequent remote procedure call and the resource cache to retrieve the identifier

726 — modifying, by the server, the file in the volatile memory according to the file modification information, wherein the modifying comprises using the identifier to locate the file in the volatile memory

FIG. 7B

From FIG. 7A, 8

732 — after sending the wire format resource to the client, receiving, by the server, a subsequent remote procedure call from the client, the subsequent remote procedure call comprising the wire format resource and an instruction to close the file

734 — using, by the server, the cache key from the wire format resource included in the subsequent remote procedure call and the resource cache to retrieve the identifier

736 — deallocating, by the server, the file in the volatile memory, wherein the deallocating comprises using the identifier to deallocate the file in the volatile memory

738 — removing, by the server, the corresponding pointer from the resource cache

FIG. 7C

FAULT TOLERANT CLUSTER DATA HANDLING

TECHNICAL FIELD

The subject application generally relates to computing clusters, and, for example, to fault tolerant techniques for computing clusters to serve clients, and related embodiments.

BACKGROUND

A computing cluster is a group of connected computers that work together such that they can be viewed as a single system in many respects. Computing clusters generally comprise multiple cluster servers, also referred to as nodes, which are controlled and scheduled by software. The nodes can be configured with the capability to perform the same tasks, so in the event of a failed node, another node can take over tasks of the failed node.

Computing clusters generally include technologies that enable cooperation between the nodes. However, node cooperation comes at the expense of computing overhead. For example, consider the operation of opening a file on a node in a clustered computing environment. A node in the cluster can open a file in response to a client request. The node can open the file and assign a file descriptor to the file. The file descriptor can be used quite efficiently by the node to refer to the opened file in connection with performing subsequent work on the file. However, the file descriptor only has meaning on the node that opened the file, which can lead to delays in recovering the file if the node fails.

To address such a problem, a cluster can use stateless protocols such as Network File System version 3 (NFSv3). A stateless protocol can eliminate issues of tracking resources, such as file descriptors, because a stateless protocol by definition does not have server-side resources that persist between client calls. However, stateless protocols are less efficient and can require, e.g. re-opening a file at the node operating system level for every write operation in a long sequence of write operations.

Supporting effective node cooperation while also reducing the computing overhead required for such node cooperation remains an important area of development for cluster computing technologies.

BRIEF DESCRIPTION OF THE DRAWINGS

The technology described herein is illustrated by way of example and not limited in the accompanying figures in which like reference numerals indicate similar elements and in which:

FIG. 7B is a flow diagram of an example, non-limiting computer implemented method for cluster server response to a first example subsequent communication from a client, in accordance with one or more embodiments described herein.

FIG. 7C is a flow diagram of an example, non-limiting computer implemented method for cluster server response to a second example subsequent communication from a client, in accordance with one or more embodiments described herein.

DETAILED DESCRIPTION

Figure 1:
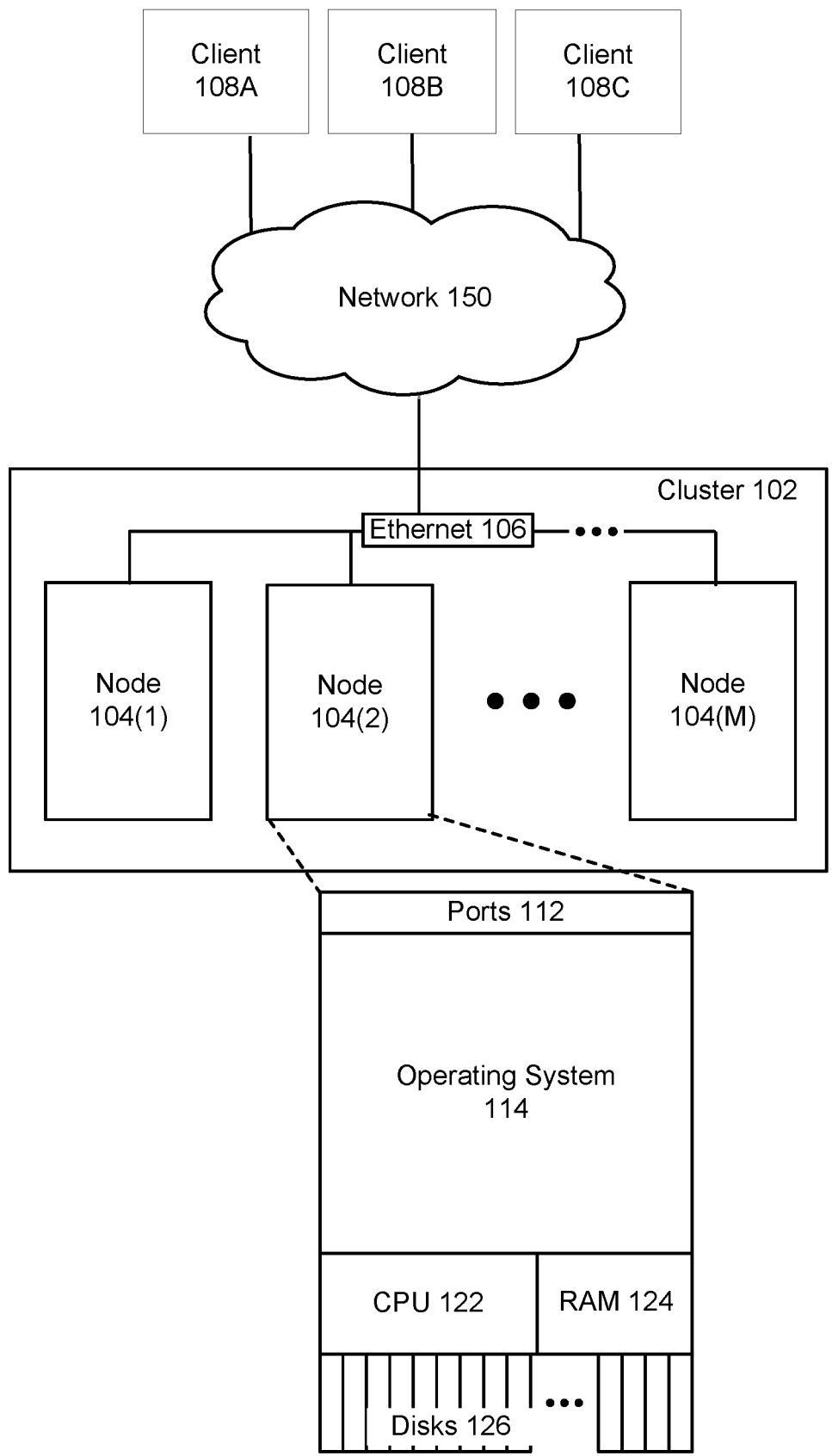
FIG. 1 illustrates an example cluster of computing devices, in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

Example embodiments are directed to fault tolerant cluster data handling techniques, as well as devices and computer readable media configured to perform the disclosed fault tolerant cluster data handling techniques. Nodes in a computing cluster can be configured to generate wire format resources corresponding to operating system resources. A wire format resource can comprise a cache key and information (referred to herein as "hint" information) to locate data, such as a file, corresponding to the operating system resource. The wire format resource can be stored in a resource cache along with a pointer that points to the operating system resource. The wire format resource can also be provided to client devices. Nodes in the computing cluster can be configured to receive and process client instructions that include wire format resources, as well as to use hint information to re-allocate data associated with a wire format resource.

FIG. 1 illustrates an example cluster of computing devices, in accordance with one or more embodiments described herein. FIG. 1 includes a cluster 102 of node devices, referred to in FIG. 1 as nodes 104(1), 104(2) ... 104(M). Each node 104(1), 104(2) ... 104(M) can comprise a computing device. Nodes 104(1), 104(2) ... 104(M) can be configured to serve objects in response to requests from clients 108A, 108B, 108C. Furthermore, nodes 104(1), 104(2) ... 104(M) can receive instructions such as remote procedure calls (RPCs) from clients 108A, 108B, 108C, and nodes 104(1), 104(2) ... 104(M) can manipulate data stored at the cluster 100 according to the client 108A, 108B, 108C instructions. In some embodiments, one of the nodes 104(1), 104(2) ... 104(M) can host a cluster controller virtual machine (not shown in FIG. 1), making that node the cluster controller node which administers the cluster 102. In other embodiments, the nodes 104(1), 104(2) ... 104(M) can be peers without implementing a leader-follower architecture. The nodes 104(1), 104(2) ... 104(M) can be coupled to each other via a suitable data communications link comprising interfaces and protocols such as, but not limited to, Ethernet block 106.

Clients 108A, 108B, 108C can send requests to the cluster 102 via network 150, e.g., the Internet or any other communications network. Client communications to the cluster 102 can be configured, for example, as remote procedure calls (RPCs). An RPC can originate at a computer program within a client 108A, 108B, or 108C. The computer program uses an RPC to cause a procedure or subroutine to execute in a remote address space (e.g. at cluster 102). The RPC can be coded as if it were a normal (local) procedure call, without the programmer explicitly coding the details for the remote interaction. The cluster 102 can optionally be configured as one large object namespace. The cluster 102 can maintain an unlimited number of objects, e.g., up to trillions of objects or more. To this end, a node such as the node 104(2) can comprise ports 112 by which clients 108A, 108B, and 108C connect to the cluster 102. Example ports 112 are provided for requests via various protocols, including but not limited to TCP (transmission control protocol).

Each node, such as the node 104(2), can include an instance of an operating system 114, e.g., a OneFS® or other operating system. Each node, such as the node 104(2), can furthermore include a CPU 122, RAM 124, and storage devices such as disks 126. RAM 124 and disks 126 can comprise, e.g., volatile memory, nonvolatile memory, hard disk drives, solid-state drives or other types of memory devices. Furthermore, RAM 124 and disks 126 at multiple of the storage nodes 104(1)-104(M), as well as other storage devices attached to the cluster 102, can be used to collectively support a logical disk which provides a shared storage location for the cluster 102.

It should be emphasized that cluster deployments can be of any size. Depending on the needs of a particular organization, some clusters may comprise five or fewer nodes, while large clusters can comprise much larger numbers of nodes. The technologies disclosed herein can be included in clusters of any size, as can be appreciated.

Figure 2:
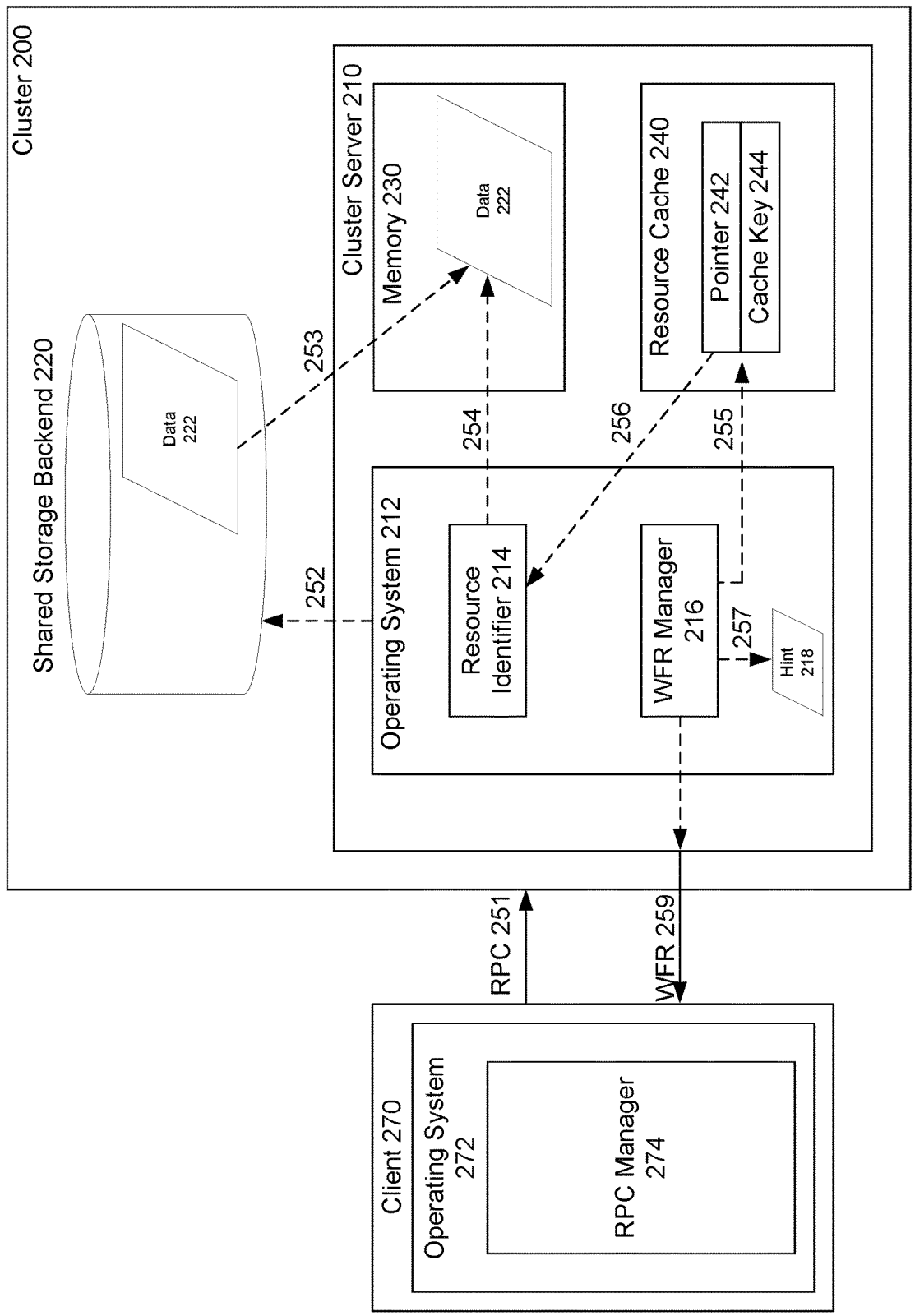
FIG. 2 illustrates example elements and operations of a cluster server involved in response to an initial communication from a client, in accordance with one or more embodiments described herein.

FIG. 2 illustrates example elements and operations of a cluster server involved in response to an initial communication from a client, in accordance with one or more embodiments described herein. FIG. 2 includes a cluster 200 and a client 270. The client 270 sends an initial communication to the cluster 200, in the form of RPC 251. The cluster 200 includes a shared storage backend 220 and an example cluster server 210. The cluster 200 can also include additional cluster servers, not shown in FIG. 2. The cluster 200 is an example embodiment of a cluster 102 such as illustrated in FIG. 1, the cluster server 210 is an example embodiment of a node 104(2) such as illustrated in FIG. 1, and the client 270 is an example embodiment of a client 108A such as illustrated in FIG. 1.

FIG. 2 illustrates various example elements of the cluster server 210 and the shared storage backend 220. The shared storage backend 220 can generally include cluster data, such as data 222, which represents an example data object, such as a file, or other object. The cluster server 210 can include, inter alia, an operating system 212, a memory 230, and a resource cache 240. The operating system 212 can retrieve data from the shared storage backend 220 and store it in the memory 230, for example, data 222 is stored in the memory 230. The operating system 212 can create a resource identifier such as resource identifier 214, which identifies data 222 stored in the memory 230.

The operating system 212 can further comprise a wire format resource (WFR) manager 216. The WFR manager 216 can generate and manage wire format resources in accordance with the techniques disclosed herein. In an embodiment, a wire format resource can include hint information, such as hint 218, and a cache key, such as cache key 244. The WFR manager 216 can store the cache key 244 and a corresponding pointer 242 in the resource cache 240. The pointer 242 can point to the resource identifier 214.

The client 270 can comprise an operating system 272, and the operating system 272 can comprise a RPC manager 274. The RPC manager 274 can generally be configured to carry out client task operations pertaining to data 222 by generating and sending RPCs to cluster 200. For example, RPC manager 274 can generate and send RPC 251 to cluster 200.

In a set of example operations according to FIG. 2, the client 270 initially sends RPC 251 to the cluster 270. The initial RPC 251 identifies some data, such as data 222, to be opened at the cluster 200. For simplicity of explanation, data 222 can be considered to be a file. The cluster 200 assigns the client 270 to the cluster server 210, and cluster 200 forwards the RPC 251 to the cluster server 210. In response to receiving the RPC 251, the operating system 212 accesses 252 the shared storage backend 220 to cause data 222 to be opened in memory 230. The operating system 212 can furthermore create and store the resource identifier 214, which is used to identify the data 222 in the memory 230 when performing subsequent work on the data 222 in the memory 230.

In addition to creating the resource identifier 214, the operating system 212 can be configured to cause the WFR manager 216 to generate a WFR corresponding to the resource identifier 214, and to send the WFR 259 to the client 270. The client 270, e.g., the RPC manager 274 at the client 270, can be configured to include the received WFR 259 in subsequent RPCs involving the data 222. Operations in connection with subsequent RPCs are further described with reference to FIG. 3.

In order to generate the WFR 259, the WFR manager 216 can create a cache key 244, and can pair the cache key 244 with the resource identifier 214, so the cache key 244 corresponds with the resource identifier 214. The WFR manager 216 can store the cache key 244 in the resource cache 240, along with a pointer 242. The pointer 242 can point to the resource identifier 214, e.g., by pointing to a location where the resource identifier 214 is stored. The WFR manager 216 can furthermore be configured to create hint information, such as hint 218, which can be used to locate the data 222 within the shared storage backend 220, if necessary. Hint 218 can include, e.g., a file path or other information that can be used to look up data 222 on the shared storage backend 220. Hint 218 can optionally also include so-called "open flags," i.e., information pertaining to how to open data 222, e.g. whether or not to open date 222 as append-only. The WFR manager 216 can combine the hint 218 and the cache key 244 to produce the WFR 259, and the cluster server 210 can send the WFR 259 to the client 270, in response to the initial RPC 251.

Figure 3:
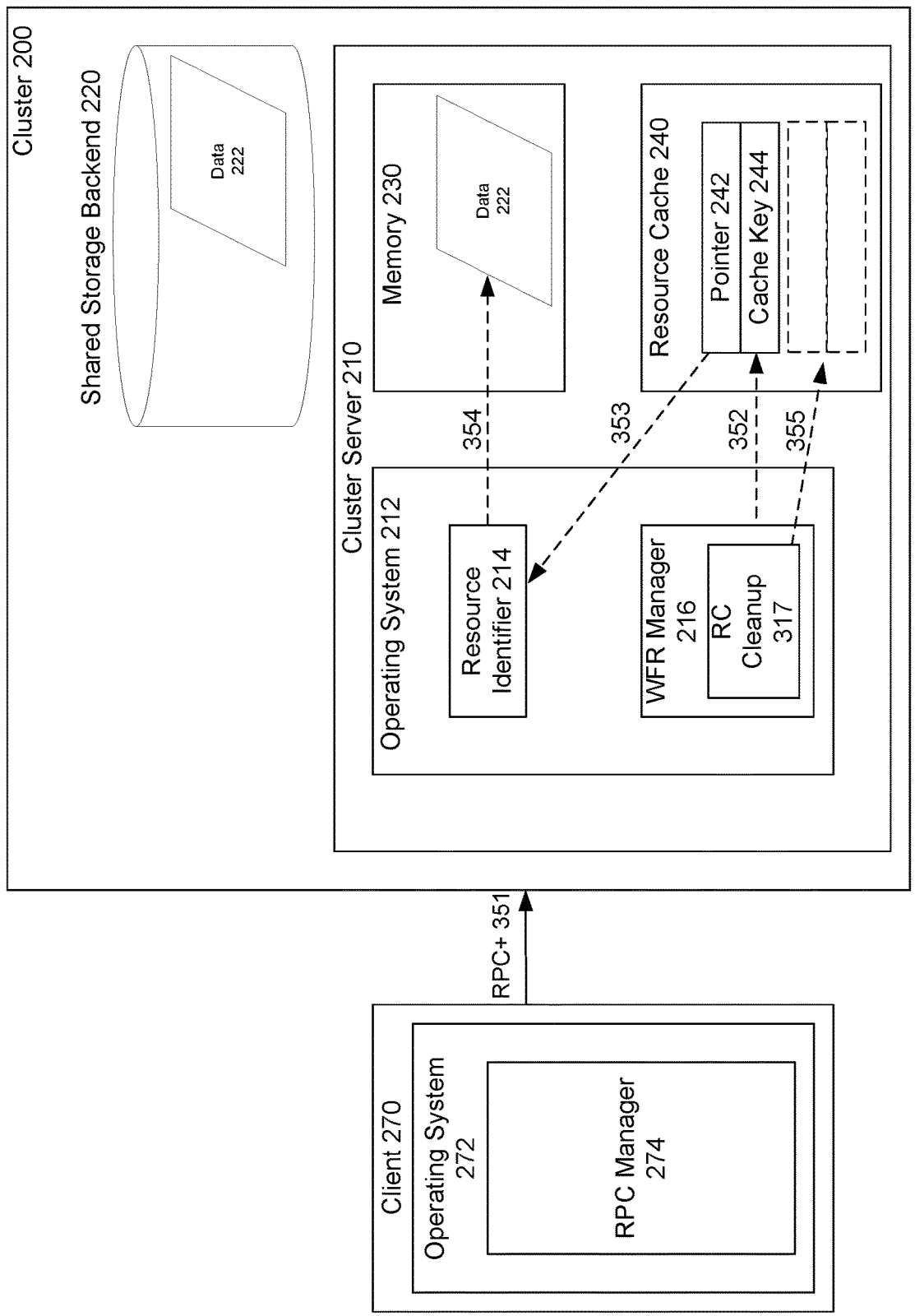
FIG. 3 illustrates example elements and operations of a cluster server involved in response to a subsequent communication from a client, in accordance with one or more embodiments described herein.

FIG. 3 illustrates example elements and operations of a cluster server involved in response to a subsequent communication from a client, in accordance with one or more embodiments described herein. FIG. 3 includes the client 270, cluster 200, shared storage backend 220 and cluster server 210 introduced in FIG. 2, and repetitive description of like elements is omitted for the sake of brevity.

In FIG. 3, the client 370 sends a subsequent communication, namely RPC+ 351, to the cluster 200. The RPC+ 351 is sent subsequent to sending an initial communication such as RPC 251, illustrated in FIG. 2. Furthermore, the RPC+ 351 is sent subsequent to client 270 receipt of WFR 259. The client 270, e.g., the RPC manager 274, can be configured to include the WFR 259 in subsequent communications to cluster 200 pertaining to data 222. Therefore, RPC+ 351 can include WFR 259. The RPC+ 351 can furthermore include one or more instructions with respect to data 222, e.g., instructions to modify data 222 or instructions to close a file represented by data 222.

The cluster 200 can receive the RPC+ 351 and provide the RPC+ 351 to the appropriate cluster server, that is, to the cluster server 210 with which the client 270 has established a connection. In response to receiving the RPC+ 351 at the cluster server 210, the WFR manager 216 can extract the cache key included in the RPC+ 351, namely, the cache key previously included in the WFR 259. The WFR manager 216 can then look up 352 the cache key extracted from RPC+ 351 in the resource cache 240. In this example, the cache key included in RPC+ 351 is cache key 244, and so WFR manager 216 can look up 352 cache key 244 in the resource cache 240. When the cache key 244 is found, the WFR manager 216 can refer to the corresponding pointer 242 in order to locate 353 the resource identifier 214. The operating system 212 can then proceed to use the resource identifier 214 to identify 354 data 222, in order to process the one or more instructions on data 222 in accordance with RPC+ 351.

In another aspect of FIG. 3, a resource cache (RC) cleanup 317 is illustrated within the WFR manager 216. Embodiments can include a RC cleanup 317 configured to clean up the resource cache 240 by removing data therefrom. For example, FIG. 3 illustrates an operation 355 in which RC cleanup 317 removes a cache key/pointer pair (represented as a pair of boxes in FIG. 3) from the resource cache 240. In some embodiments, the RC cleanup 317 can be configured to employ a cache eviction policy such as "least recently used", or any other appropriate cache eviction policy.

Figure 4:
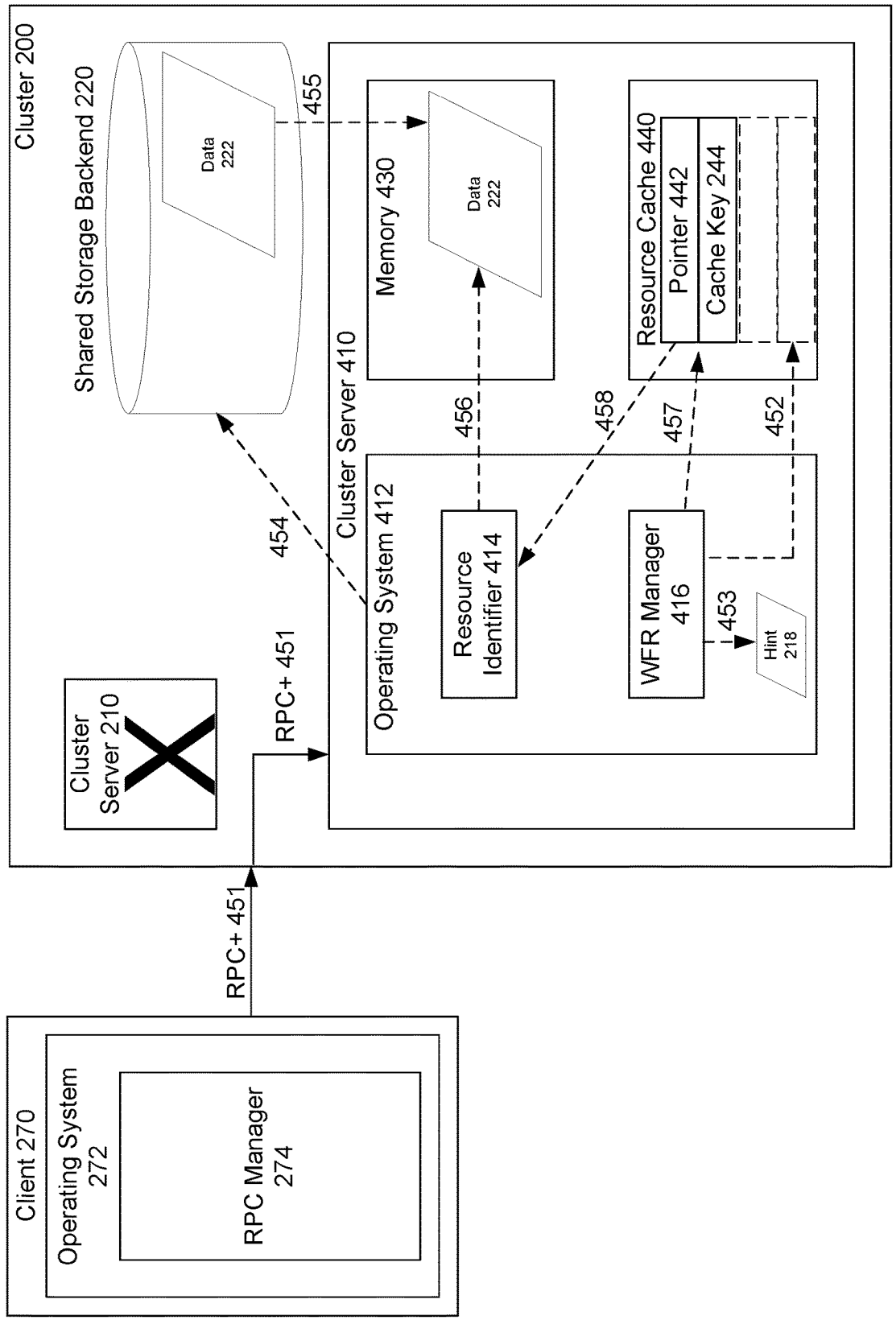
FIG. 4 illustrates example elements and operations of a cluster server involved in response to a client communication which includes an unidentified wire format resource, in accordance with one or more embodiments described herein.

FIG. 4 illustrates example elements and operations of a cluster server involved in response to a client communication which includes an unidentified wire format resource, in accordance with one or more embodiments described herein. FIG. 4 includes the client 270, cluster 200, shared storage backend 220 and cluster server 210 introduced in FIG. 2, and repetitive description of like elements is omitted for the sake of brevity. In FIG. 4, the cluster server 210 has crashed, and so the cluster 200 can connect the client 270 to another node in the cluster, such as cluster server 410.

Cluster server 410 can include components similar to those illustrated in cluster server 210 in FIG. 2. Therefore, cluster server 410 can include an operating system 414, a memory 430, and a resource cache 440. The operating system 412 can include a WFR manager 416.

In FIG. 4, RPC+ 451 illustrates another subsequent RPC call from the client 270. Like RPC+ 351, RPC+ 451 can include WFR 259 and instructions pertaining to data 222. The cluster server 410 receives RPC+ 451 and, similar to the operations described with reference to FIG. 3, the WFR manager 416 can extract the cache key from RPC+ 451, and attempt 452 to look up the extracted cache key in the resource cache 440. However, in this example, the cluster server 410 does not initially have the cache key 244 in its resource cache 440. Therefore, a result of attempt 452 is a discovery that cache key 244 is not in resource cache 440. Cache key 244 can nonetheless later be stored in resource cache 440, and for this reason the cache key 244 is illustrated in resource cache 440 in FIG. 4.

In response to initial absence of cache key 244 in resource cache 440, the WFR manager 416 can be configured to extract 453 hint information 218 from the RPC+ 451. WFR manager 416 can cause the operating system 412 to use hint information 218 to retrieve 454 data 222 from shared object storage backend 220. The operating system 412 can store 455 the data 222 in the memory 430. The operating system 412 can generate 456 a resource identifier 414 that identifies the data 222 in the memory 430. The operating system 412 can furthermore perform any operations on the data 222 in the memory 430 in accordance with instructions included in the RPC+ 451.

Furthermore, the WFR manager 416 can be configured to store 457 the cache key 244 in the resource cache 440. Note that the cache key 244 can remain the same as received via RPC+ 451. The client 272 need not use a different cache key in subsequent RPCs. The WFR manager 416 can also store a pointer 442 with the cache key 244, wherein the pointer 442 points to the resource identifier 414. To handle future RPCs, received from client 272 after RPC+ 451, the WFR manager 416 can perform operations such as those described in connection with FIG. 3, due its having stored the cache key 244 and the pointer 442 in the resource cache 440.

Figure 5:
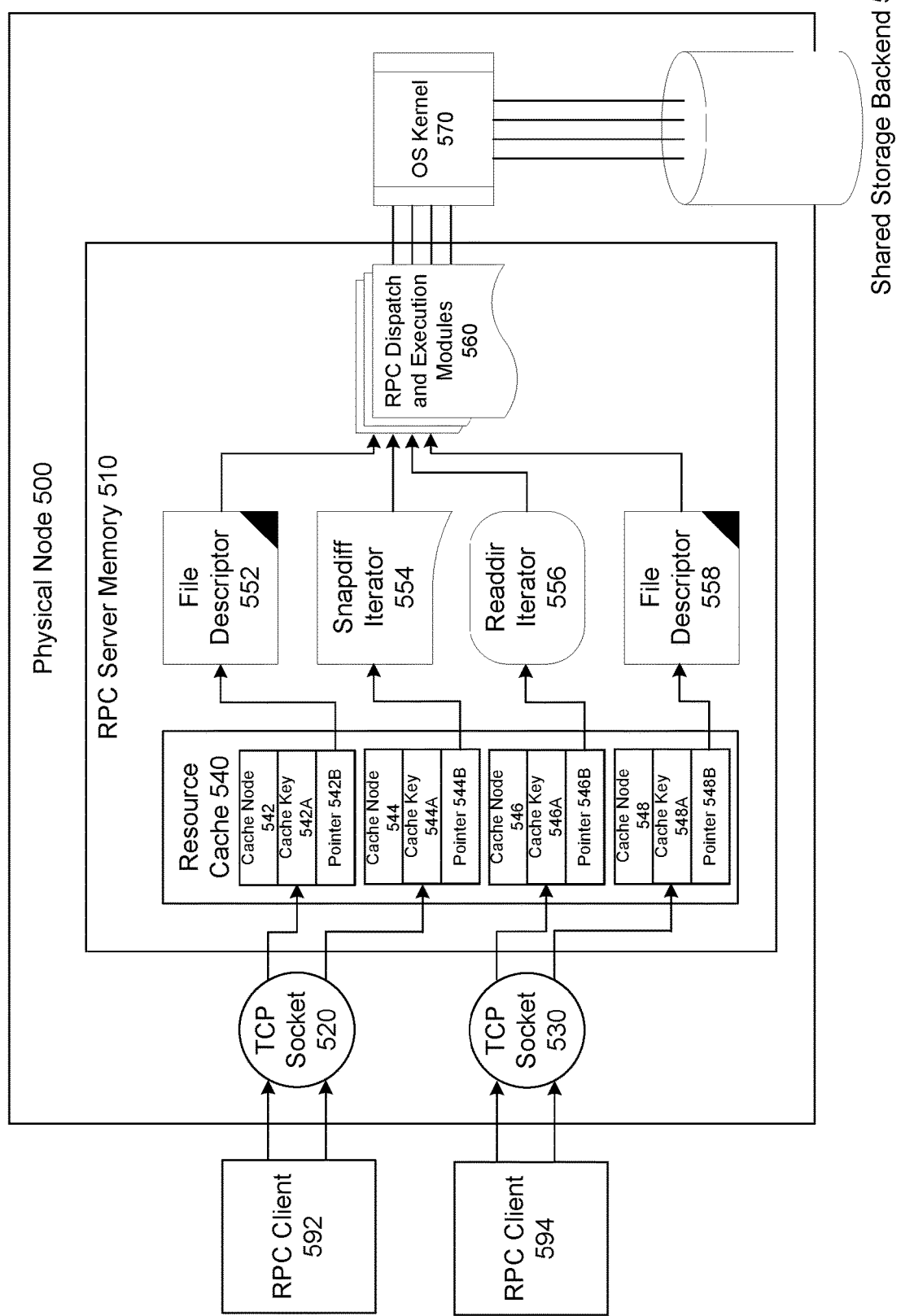
FIG. 5 illustrates an example arrangement of elements in a cluster physical node, in accordance with one or more embodiments described herein.

FIG. 5 illustrates an example arrangement of elements in a cluster physical node, in accordance with one or more embodiments described herein. The example physical node 500 can implement a cluster server such as 210 and 410 in some embodiments, and the RPC clients 592, 594 can implement clients such as client 270 in some embodiments. The physical node 500 comprises Transmission Control Protocol (TCP) sockets 520 and 530, an RPC server memory 510, and an operating system (OS) kernel 570. A shared storage backend 580 can optionally be partially implemented at physical node 500, and partially implemented at other nodes in a cluster comprising the physical node 500. TCP sockets 520 and 530 can be mediated by the OS kennel 570.

The RPC server memory 510 can comprise a memory that is used by an RPC server hosted at the physical node 500. The RPC server memory 510 includes a resource cache 540, various resource identifiers such as file descriptor 552, snapdiff iterator 554, readdir iterator 556, and file descriptor 558, and RPC dispatch and execution modules 560. The resource cache 540 is an example of a resource cache such as 240 and 440, and the file descriptor 552, snapdiff iterator 554, readdir iterator 556, and file descriptor 558 are example resource identifiers such as 214 and 414. With regard to snapdiff/readdir iterators 554 and 556, these are example resource identifiers used in Isilon® and OneFS® type clusters made by DELL®. These example resources can behave generally like file descriptors with respect to how they interact with the resource cache 540, however, snapdiff/ readdir iterators may not be available on generic Portable Operating System Interface (POSIX) systems.

The illustrated resource cache 540 includes four example cache nodes 542, 544, 546, 548. Each respective cache node 542, 544, 546, 548 comprises a respective cache key 542A, 544A, 546A, 548A, and a respective corresponding pointer 542B, 544B, 546B, 548B. Each of the pointers 542B, 544B, 546B, 548B points to a resource: pointer 542B points to file descriptor 552, pointer 544B points to snapdiff iterator 554, pointer 546B points to readdir iterator 556, and pointer 548B points to file descriptor 558.

In example operations according to FIG. 4, an RPC client, such as RPC client 592 can send an RPC, e.g., illustrated as the top arrow extending from RPC client 592 in FIG. 5, to physical node 500. The physical node 500 can receive the RPC at TCP socket 520. An RPC server can look up a cache key included in the RPC, to determine whether the cache key included in the RPC matches any cache keys stored in the resource cache 540. For example, the cache key included in the RPC can match cache key 542A.

In response to finding a matching cache key 542A in the resource cache 540, the RPC server can use the corresponding pointer 542B to locate the resource associated with the RPC. In this example, the pointer 542B points to file descriptor 552. The RPC server can use the identified resource, namely file descriptor 552, and an appropriate corresponding RPC dispatch and execution module 560, to process instructions included in the received RPC. The file descriptor 552 can refer to a file (not shown in FIG. 5) which is loaded in the RPC server memory 510.

In the event that data, e.g., the file corresponding to file descriptor 552, is not found in RPC server memory 510, then the RPC server can be configured to retrieve the file to load it into RPC server memory 510. The RPC server can instruct the OS kernel 570 to retrieve the file from the shared storage backend 580. The file can be loaded into RPC server memory 510, and the RPC server can generate an updated file descriptor and an updated cache node, wherein the updated cache node includes an updated pointer that refers to the updated file descriptor. The cache key 542A remains unchanged, so the RPC client 592 doesn't need to know about the newly updated file descriptor or the updated cache node.

The above described example operations for an RPC represented by the top arrow extending from RPC client 592 can similarly be performed for subsequent and/or other RPCs from RPC clients 592 and 594. The various other arrows extending from RPC clients 592 and 594 in FIG. 5 illustrate subsequent and/or other RPCs, which include WFRs that incorporate cache keys that match, e.g., cache key 544A, cache key 546A, or cache key 548A.

Embodiments of this disclosure can optionally be deployed in connection with data mover (DM) services. An example DM allows replicating file system datasets to other systems/clusters. DMs can be designed to run in a fault-tolerant manner—that is, work continues as much as possible if external dependencies, like network connections or underlying physical machines, suffer outages while being used by DM. A major part of the DM's ability to continue operation in an unstable environment is how it handles resources, like file descriptors, which are necessarily local to one operating system instance. For a simple example: if a file is opened on one node in a clustered compute/storage environment such as OneFS®, the identifier (file descriptor) for that file only has meaning on the node that opened it. Yet, if that node stops functioning, DM's transport layer can use the techniques described herein to provide continuity of operation to the data transfer logic running on top of it. In the case of a file descriptor, this involves obtaining a new but otherwise equivalent file descriptor on another node in a manner transparent to the client executing the data transfer logic, for example as described in connection with FIG. 4. Ideally, the client carrying out the actual data transfer algorithm need not be aware that its requests are now being executed on another physical node. This paradigm allows for simplification of the design of the data transfer algorithm, since every potential service-interruption case does not need to be handled by the data transfer algorithm—it is instead delegated to the transport layer.

This disclosure introduces, inter alia, the concept of a resource cache. In some embodiments, a resource cache can comprise a distributed data structure for storing operating-system level resources like file descriptors, and wire format resources, which can comprise representations of those operating-system level resources, suitable for transmission over the network. The wire format resources can allow clients to transact with DM RPC servers without needing to track which physical node in a cluster of servers is servicing the request.

Clients can require resources to do work on a remote system such as a cluster. If a file is opened at a cluster server, a file descriptor that corresponds to the opened file can be allocated. Such a file descriptor is one example of a resource, other examples include readdir and snap diff iterators. These constructs don't have meaning beyond the cluster server where they were created.

In some embodiments, a DM RPC application programming interface (API) can be explicitly designed as a stateful interface: a resource (e.g. produced by an open( ) command) can first obtained, and then the resource can be used as an argument to subsequent calls (e.g. an RPC comprising a truncate( ) command). The resource can eventually be closed (e.g. pursuant to an RPC comprising a close( ) command). Consequently, the resource cache described herein can be used to track state between RPCs.

In some embodiments, each participating server node in a cluster can run an instance of the resource cache as part of its DM RPC server, the component that services client requests. When a client acquires a resource, the actual resource (i.e. the thing that only has meaning within the current cluster server, the one that created it) remains in memory on the node executing the RPC request, and a reference to the resource, along with a cache key, is stored in the cluster server's resource cache. The RPC server then generates and returns a wire format version of the resource, which contains a cluster unique cache key, to the client, which holds on to the wire format resource for use in future work. Note that each participating node, as part of its RPC server, has its own in-memory resource cache. A resource added to one node's resource cache need not be visible in another node's resource cache.

To do work on the remote cluster, such as truncating a file, the client can present its wire format resource, acquired from a previous open-type RPC request, as an argument to the truncate RPC call. The resource cache can be given the wire format resource's cache key and can use that cache key to retrieve the stored real resource, which the RPC server can use to execute the client's request. Similarly, in operations that deallocate resources (such as RPCs comprising a file close command), the client can first present its wire format resource, which the server can use to obtain the real resource via the wire format resource's cache key. The server can then use the real resource to execute the client's request (which generally consumes the real resource). Finally, the server can remove the reference to the real resource from the resource cache.

Some example designs can enable seamless mobility between nodes. In order to accomplish seamless mobility: 1) each resource's cache key can be unique within the lifespan of a cluster; and 2) each wire format resource can contain enough information to reestablish an equivalent real resource on a new cluster server if necessary. Information to reestablish an equivalent real resource on a new cluster server is referred to herein as "hints."

Consider the flow of events when a remote cluster node becomes unavailable while holding resources and servicing client requests: 1) client connects to a certain node, acquires a lot of resources, gets back wire format resources; 2) node becomes unavailable; 3) client connects to new node; 4) client presents wire format resource; 5) cache key is not found, as it is unique and the node that originally issued it is no longer available; 6) new node uses hints in wire format resource to re-establish real resource (e.g. for a file descriptor, this means reading a path or file global unique identifier (GUID) hint, then actually calling the OS level open( ) routine to get a new file descriptor to the same file on the shared storage backend); 7) real resource is stored in new node's cache; and 8) client continues to use old wire format resource to access reestablished real resources via new node's resource cache.

Nowhere in the above flow does the data transfer algorithm need to realize that the underlying resource corresponding to the wire format resource is no longer valid. The underlying resource can be reestablished by the new node and the client can proceed with its work as if there was never a disruption.

The resource cache can be implemented as a cache with a least-recently-used eviction scheme, allowing for rarely used entries to be aged out, in order to make room for newly-requested entries. This addresses a secondary challenge of resource capacity problems. Many resources, such as file descriptors, have a limited total quantity. Rather than preventing new resources from being created when nearing the limit, the resource cache can evict stale entries, trusting in the reacquisition property to ensure the clients owning those resources are not disrupted.

Embodiments of this disclosure can enable clients to use a stateful protocol to use resources, without worrying about which specific remote node they are currently connected to, and whether the resource they want to use was originally established on the currently connected node. This can obviate the need for complex client side state recovery schemes, because once a resource is established, a client can continue to use it without care for changes in network topology or remote system availability, provided some minimum or eventual level of availability remains.

Supporting a stateful protocol is significant in part because stateful DM RPC APIs can be advantageous. In a stateless protocol such as NFSv3, there's no issue of tracking resources because a stateless protocol will by definition not have server-side resources that persist between calls. A stateful protocol, however, offers efficiency gains: rather than needing to, for example, re-open a file at the OS level for every write operation in a long sequence of write operations, the file descriptor can remain open and can be reused for each operation. This can reduce overhead associated with each RPC call.

In a traditional stateful protocol, a client attempting to use a bad or invalid reference to server state gets an error which it must handle, such as by explicitly reestablishing the required server state and trying again. The resource cache design provided herein shifts responsibility to the RPC server, allowing resource recovery logic to be centralized and abstracted away from logic at the level of the data transfer algorithm itself. Through this mechanism, this disclosure simplifies the implementation of, e.g., DM services, allowing improved fault-tolerance.

Figure 6:
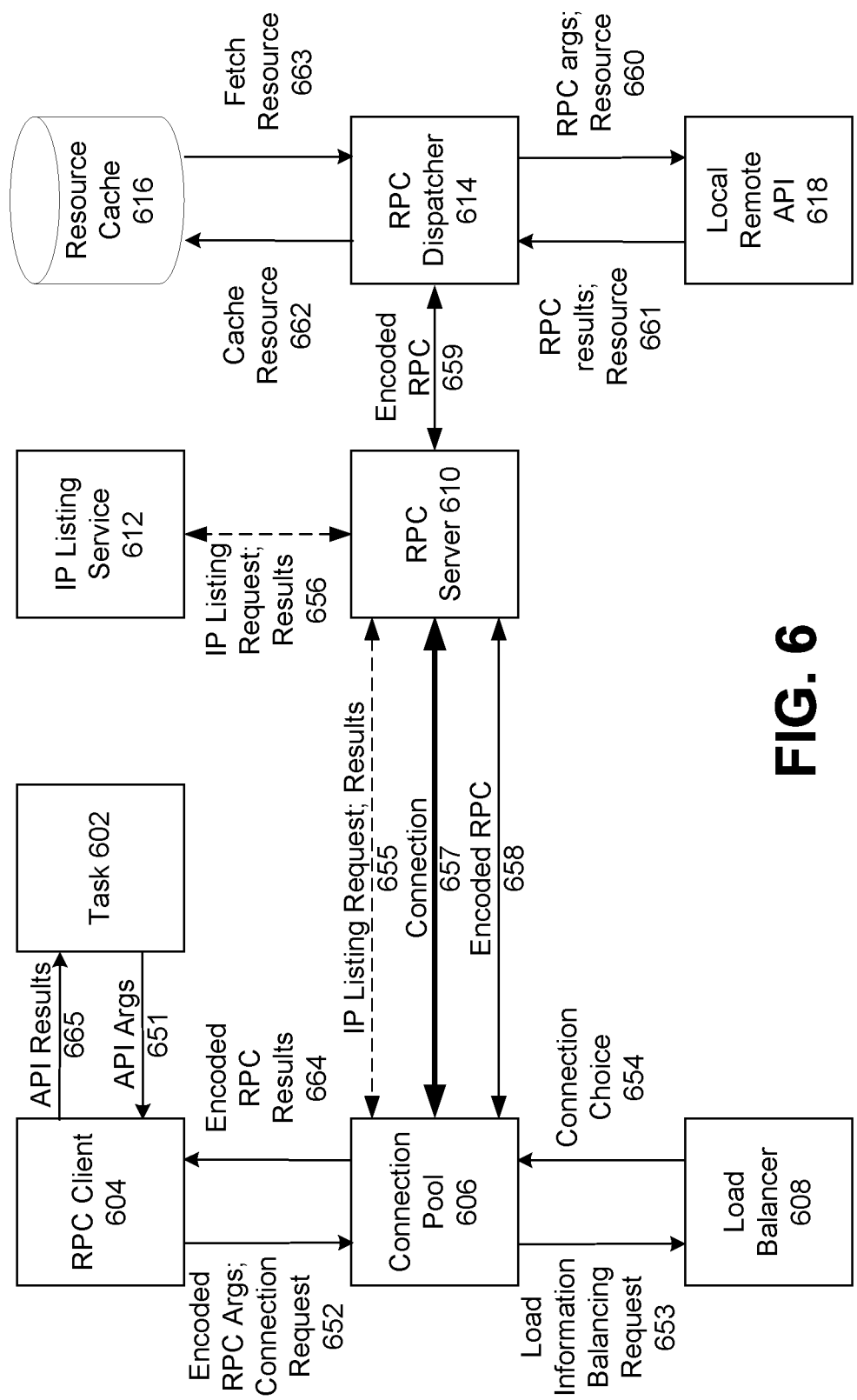
FIG. 6 illustrates example relationships and data interchange between example components, in accordance with one or more embodiments described herein.

FIG. 6 illustrates example relationships and data interchange between example components, in accordance with one or more embodiments described herein. FIG. 6 illustrates a task 602, an RPC client 604, a connection pool 606, and a load balancer 608. FIG. 6 further illustrates an RPC server 610, an IP listing service 612, an RPC dispatcher 614, a resource cache 616, and a local remote API 618.

FIG. 6 illustrates an example flow of operations involving the illustrated components. The flow of operations generally illustrates a round trip of an RPC from a client to a cluster server, and return of RPC results back to the client.

A client-side task 602 can initially provide API arguments 651 to RPC client 604. The RPC client 604 can convert the API arguments 651 into RPC arguments, and the RPC client 604 can provide encoded RPC arguments and a connection request 652 to connection pool 606. The encoded RPC arguments of 652 can optionally include, e.g., a wire format resource as described herein.

The connection pool 606 provides one example approach to support client failover to a different node in a cluster. If needed, the connection pool 606 can make an IP listing request 655 to the RPC server 610 and in response to the request, connection pool 606 can receive results comprising an IP listing. In order to generate the IP listing, the RPC server 610 can make an IP listing request 656 of IP listing service 612, and RPC server 610 can receive the IP listing results. The connection pool 653 can provide a load information balancing request 653 to load balancer 608, and the load balancer 608 can respond with connection choice 654.

The connection pool 606 can then establish connection 657 with RPC server 610. Connection pool 606 can send encoded RPC 658 to RPC server 610 via connection 657. Encoded RPC 658 can include a WFR as described herein as well as information derived from API arguments 651.

RPC server 610 can provide encoded RPC 659, which can be derived from or can be identical to encoded RPC 658, to RPC dispatcher 614. The RPC dispatcher 614 can use the resource cache 616 to convert a cache key in the encoded RPC 659 into a resource, as described herein. For example, a cache resource 662 can be passed to the resource cache 616, and the resource cache 616 can return a fetch resource 663. The RPC dispatcher 614 can then use the fetched resource to carry out the instructions included in the encoded RPC 659. For example, the RPC dispatcher 614 can provide RPC arguments and the appropriate resource 660 to the local remote API 618, and the local remote API 618 can return RPC results and the resource 661.

The RPC dispatcher 614 can provide encoded RPC results back to the RPC server 610, and the RPC server 610 can provide encoded RPC results back to the connection pool 606. The connection pool 606 can provide encoded RPC results 664 to the RPC client 604, and the RPC client 604 can finally convert the encoded RPC results 664 into API results 665, and provide API results 665 to the task 602.

Figure 7A:
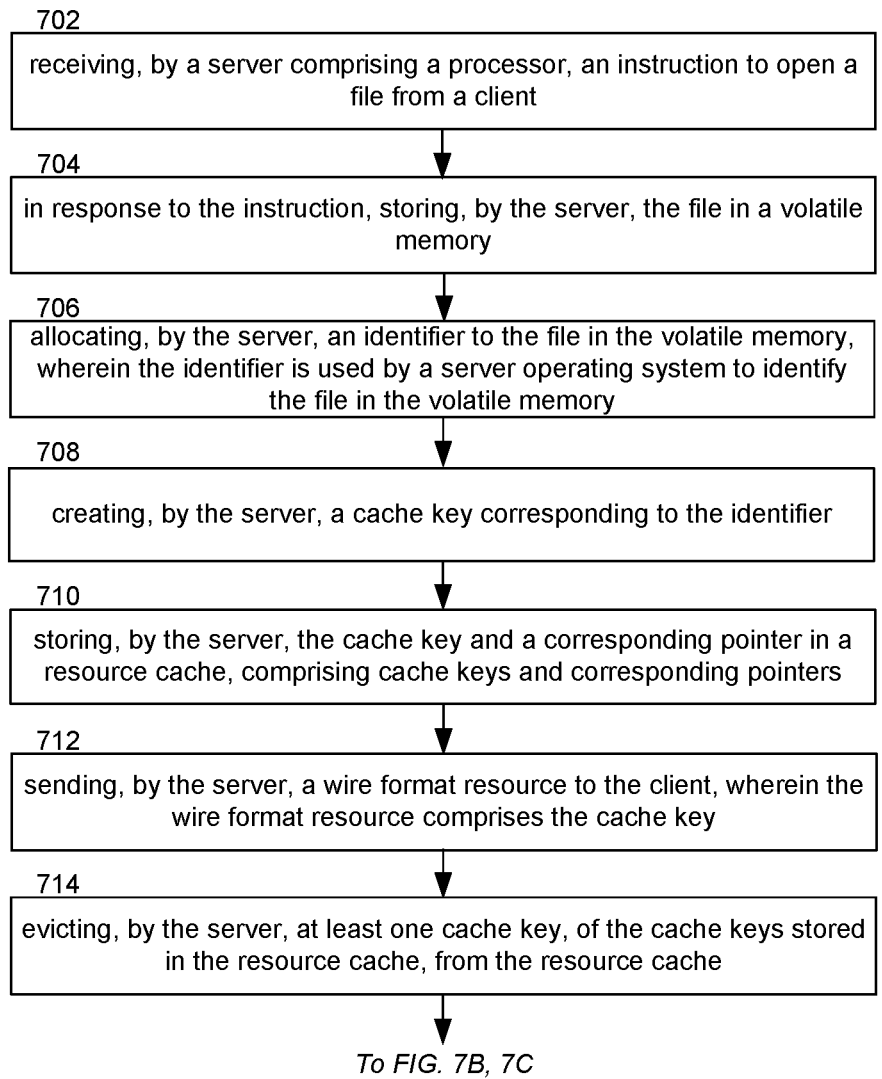
FIG. 7A is a flow diagram of an example, non-limiting computer implemented method for cluster server response to an initial communication from a client, in accordance with one or more embodiments described herein.

FIGS. 7A, 7B, and 7C are a flow diagrams of example, non-limiting computer implemented methods for cluster server responses to communications from a client, in accordance with one or more embodiments described herein. The blocks of the illustrated methods represent operations according to a method, components in one or more computing devices, and/or computer executable instructions in a computer readable storage medium, as can be appreciated. While the operations are illustrated in sequence, it can furthermore be appreciated that certain operations can optionally be re-ordered, combined, removed or supplemented with other operations in some embodiments.

In an embodiment, the method illustrated in FIG. 7A can be performed by a cluster server 210 in response to an initial communication, such as RPC 251, from a client 270 such as illustrated in FIG. 2. At 702, the cluster server 210 can receive an instruction, e.g., RPC 251, to open a file, e.g., data 222 at shared storage backend 220, from a client 270. At 704, in response to the instruction 251, the cluster server 210 can store the file 222 in a volatile memory 230. At 706, the cluster server 210 can allocate an identifier, e.g., resource identifier 214, to the file 222 in the volatile memory 230, wherein the identifier 214 is used by a server operating system 212 to identify the file 222 in the volatile memory 230.

At 708, the cluster server 210 can create a cache key 244 corresponding to the identifier 214. The cache key 244 can be unique within the cluster 200. The cluster server 210, e.g., a client cluster server or "client node", can furthermore create hint information 218 for a WFR 259. At 710, the cluster server 210, e.g., a server cluster server or "server node", can store the cache key 244 and a corresponding pointer 242 in a resource cache 240, the resource cache 240 comprising cache keys and corresponding pointers. The corresponding pointer 242 points to the identifier 214. At 712, the cluster server 210 can send a wire format resource 259 to the client 270, wherein the wire format resource 259 comprises the cache key 244. The wire format resource 259 can furthermore comprise hint information 218 to enable locating the file 222 in a shared cluster storage, such as shared storage backend 220, by a subsequent cluster server in the cluster 200, e.g., by cluster server 410 as described with reference to FIG. 4.

At 714, the cluster server 210 can evict at least one cache key, of the cache keys stored in the resource cache 230, from the resource cache 230. The eviction can follow a cache eviction strategy such as, e.g., a least recently used eviction protocol. Operation 714 can be performed periodically or for example in response to the resource cache 230 reaching a threshold size. Furthermore, operation 714 can be performed at any point or in parallel with the other operations illustrated in FIGS. 7A, 7B, 7C, 8, and 9.

After the wire format resource 259 is created and provided to the client 270 according to the method of FIG. 7A, the cluster server 210 can process subsequent RPCs from the client 270 according to the methods illustrated in FIGS. 7B and/or 7C.

With reference to FIG. 7B, at 722, after sending the wire format resource 259 to the client 270 according to operation 712, the cluster server 210 can receive a subsequent remote procedure call, e.g., RPC+ 351, from the client 270, as illustrated in FIG. 3. The subsequent remote procedure call 351 can comprise the wire format resource 259 and file modification information, such as an instruction to modify a file by truncating the file or otherwise modifying file properties. At 724, the cluster server 210 can use the cache key 244 from the wire format resource 259 included in the subsequent remote procedure call 351, and the resource cache 230, to retrieve the identifier 214. The cluster server 210 can extract the cache key from RPC+ 351, look it up in the resource cache 240, and use the corresponding pointer 242 to retrieve the identifier 214. At 726, the cluster server 210 can modify the file 222 in the volatile memory 230 according to the file modification information, wherein the modifying comprises using the identifier 214 to locate the file 222 in the volatile memory 230.

With reference to FIG. 7C, at 732, after sending the wire format resource 259 to the client 270 according to operation 712, the cluster server 210 can receive a subsequent remote procedure call, e.g., RPC+ 351, from the client 270, as illustrated in FIG. 3. In the example provided by FIG. 7C, the subsequent remote procedure call 351 can comprise the wire format resource 259 and an instruction to close the file 222. At 734, the cluster server 210 can use the cache key 244 from the wire format resource 259 included in the subsequent remote procedure call 351 and the resource cache 240 to retrieve the identifier 214. The cluster server 210 can extract the cache key from RPC+ 351, look it up in the resource cache 240, and use the corresponding pointer 242 to retrieve the identifier 214. At 736, the cluster server 210 can deallocate the file 222 in the volatile memory 230, wherein the deallocating comprises using the identifier 214 to deallocate the file 222 in the volatile memory 230. At 738, the cluster server 210 can remove the corresponding pointer 242 from the resource cache 240.

Figure 8:
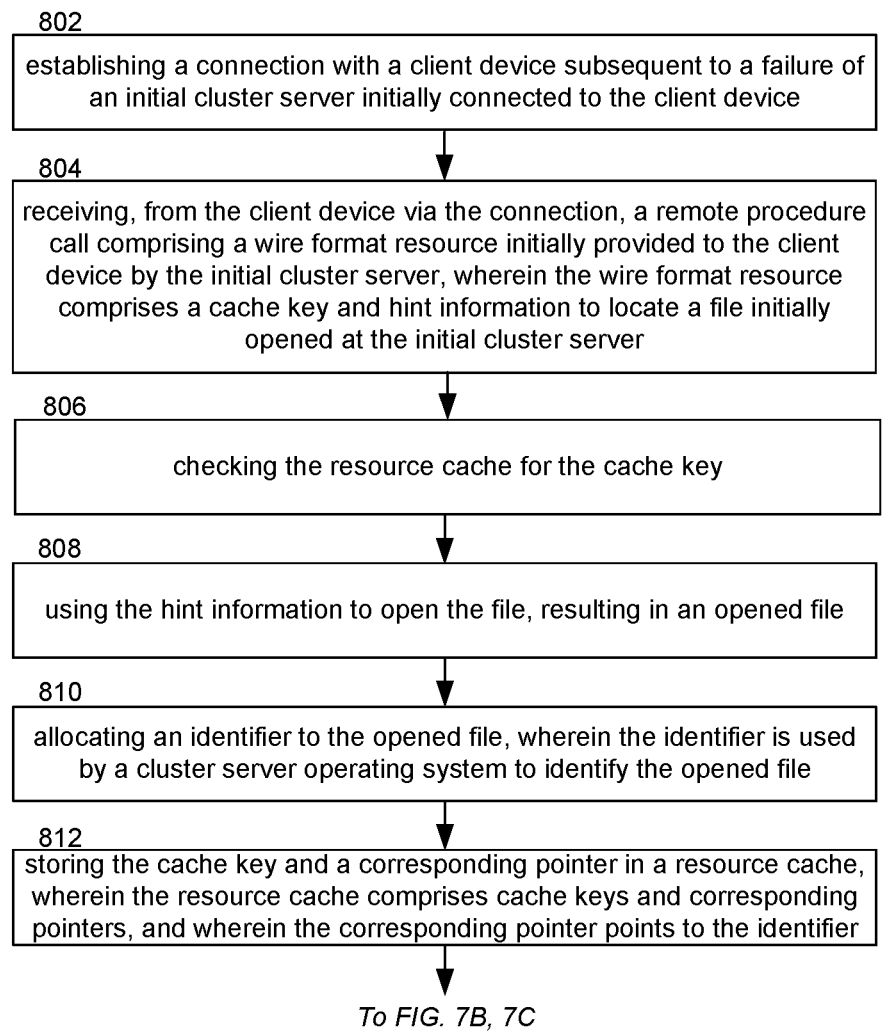
FIG. 8 is a flow diagram of an example, non-limiting computer implemented method for cluster server response to a client communication which includes an unidentified wire format resource, in accordance with one or more embodiments described herein.

FIG. 8 is a flow diagram of an example, non-limiting computer implemented method for cluster server response to a client communication which includes an unidentified wire format resource, in accordance with one or more embodiments described herein. The blocks of the illustrated method represents operations according to a method, components in one or more computing devices, and/or computer executable instructions in a computer readable storage medium, as can be appreciated. While the operations are illustrated in sequence, it can furthermore be appreciated that certain operations can optionally be re-ordered, combined, removed or supplemented with other operations in some embodiments.

In an embodiment, the method illustrated in FIG. 8 can be performed by a cluster server 410 in response to a client communication, such as RPC+ 451, from a client 270 such as illustrated in FIG. 4. At 802, the cluster server 410 can establish a connection with a client device 270 subsequent to a failure of an initial cluster server 210 initially connected to the client device 270. At 804, the cluster server 410 can receive, from the client device 270 via the connection, a remote procedure call, e.g., RPC+ 451, comprising a wire format resource 259 initially provided to the client device 270 by the initial cluster server 210, wherein the wire format resource 259 comprises a cache key 244 and hint information 218 to locate a file 222 initially opened at the initial cluster server 210.

At 806, the cluster server 410 can check the resource cache 440 for the cache key 244. At 808, in response to a result of the checking being that the cache key 244 is not found in the resource cache 440, the cluster server 410 can use the hint information 218 to open the file 222 resulting in an opened file. In another example, at 808, the cluster server 410 can use the hint information 218 to read the file 222, and the cluster server 410 can load the file in the volatile memory 430 pursuant to the read operation. Opening or reading the file 222 can comprise, e.g., locating the file 222 in a shared cluster storage 220 using the hint information 218.

At 810, the cluster server 410 can allocate an identifier, such as resource identifier 414, to the opened file 222, e.g., to the file 222 loaded in the volatile memory 430, wherein the identifier 414 is used by a cluster server operating system 412 to identify the opened file 222. At 812, the cluster server 410 can store the cache key 244 and a corresponding pointer 442 in a resource cache 440, wherein the resource cache 440 comprises cache keys and corresponding pointers, and wherein the corresponding pointer 442 points to the identifier 414. Having completed the steps illustrated in FIG. 8, the cluster server 410 can subsequently operate in accordance with FIGS. 7B and/or 7C to process subsequently received RPCs pertaining to data 222.

Figure 9:
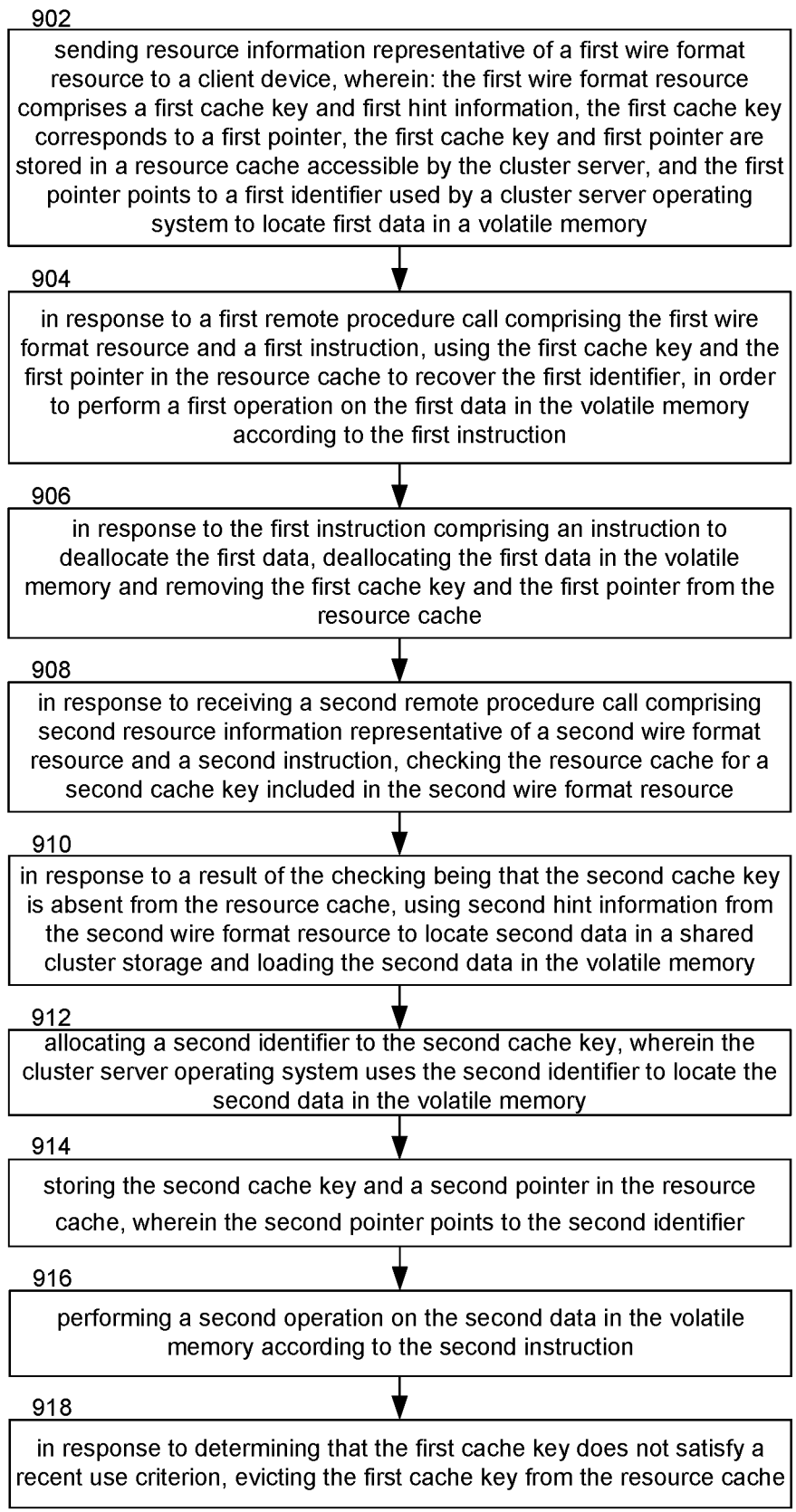
FIG. 9 is a flow diagram of an example, non-limiting computer implemented method for cluster server to send a wire format resource and process subsequently received instructions comprising the wire format resource, in accordance with one or more embodiments described herein.

FIG. 9 is a flow diagram of an example, non-limiting computer implemented method for cluster server to send a wire format resource and process subsequently received instructions comprising the wire format resource, in accordance with one or more embodiments described herein. The blocks of the illustrated method represent operations according to a method, components in one or more computing devices, and/or computer executable instructions in a computer readable storage medium, as can be appreciated. While the operations are illustrated in sequence, it can furthermore be appreciated that certain operations can optionally be re-ordered, combined, removed or supplemented with other operations in some embodiments.

In an embodiment, the method illustrated in FIG. 9 can be performed by a cluster server 210 such as illustrated in FIG. 2. At 902, the cluster server 210 can send resource information representative of a first wire format resource, e.g., WFR 259, to a client device 270. The first wire format resource 259 can comprise a first cache key 244 and first hint information 218; the first cache key 244 can correspond to a first pointer 242; the first cache key 244 and first pointer 242 are stored in a resource cache 240 accessible by the cluster server 210; and the first pointer 242 points to a first identifier 214 used by a cluster server operating system 212 to locate first data 222 in a volatile memory 230.

At 904, in response to a first remote procedure call, such as RPC+ 351 illustrated in FIG. 3, comprising the first wire format resource 259 and a first instruction, the cluster server 210 can use the first cache key 244 and the first pointer 242 in the resource cache 240 to recover the first identifier 214, in order to perform a first operation on the first data 222 in the volatile memory 230 according to the first instruction.

At 906, in response to the first instruction (the instruction included in RPC+ 351) comprising an instruction to deallocate the first data 222, the cluster server 210 can deallocate the first data 222 in the volatile memory 230 and the cluster server 210 can remove the first cache key 244 and the first pointer 242 from the resource cache 240. Operation 906 uses deallocation as an example, other instructions such as instructions to modify the data 222 in the memory 230 can also be processed at the cluster server 210 as described herein.

Operations 908-916 can be performed in a scenario in which the cluster server 210 performs operations described herein with reference to cluster server 410 and FIG. 4. Operations 908-916 can occur for example when another cluster server in cluster 200, which can be referred to as a second cluster server, has previously sent a second wire format resource to a client, such as client 270, and the second cluster server subsequently failed. Therefore, the client 270 presents the second WFR to the cluster server 210. The cluster server 210 performs operations 908-916 in order to set up the cache key from the second wire format resource in its resource cache 240, and in order to service client RPCs relating to second data referenced by the second wire format resource. Aspects of operations 908-916 which are not illustrated in FIG. 2 can be understood by reference to analogous elements in FIG. 4.

At 908, in response to receiving a second remote procedure call (not illustrated in FIG. 2) comprising second resource information representative of a second wire format resource and a second instruction, the cluster server 210 can check the resource cache 240 for a second cache key included in the second wire format resource. At 910, in response to a result of the checking being that the second cache key is absent from the resource cache 240, the cluster server 210 can use second hint information from the second wire format resource to locate second data (not illustrated in FIG. 2) in a shared cluster storage 220, and the cluster server 210 can load the second data in the volatile memory 230. At 912, the cluster server 210 can allocate a second identifier (not illustrated in FIG. 2) to the second cache key, wherein the cluster server operating system 272 uses the second identifier to locate the second data in the volatile memory 230. At 914, the cluster server 210 can store the second cache key (not illustrated in FIG. 2) and a second pointer (not illustrated in FIG. 2) in the resource cache 240, wherein the second pointer points to the second identifier. At 916, the cluster server 210 can perform a second operation on the second data in the volatile memory 230 according to the second instruction.

At 918, in response to determining that the first cache key 244 does not satisfy a recent use criterion, the cluster server 210 can evict the first cache key 244 from the resource cache 240. Operation 918 can be performed at any time in order to maintain the resource cache 240, as described herein.

Figure 10:
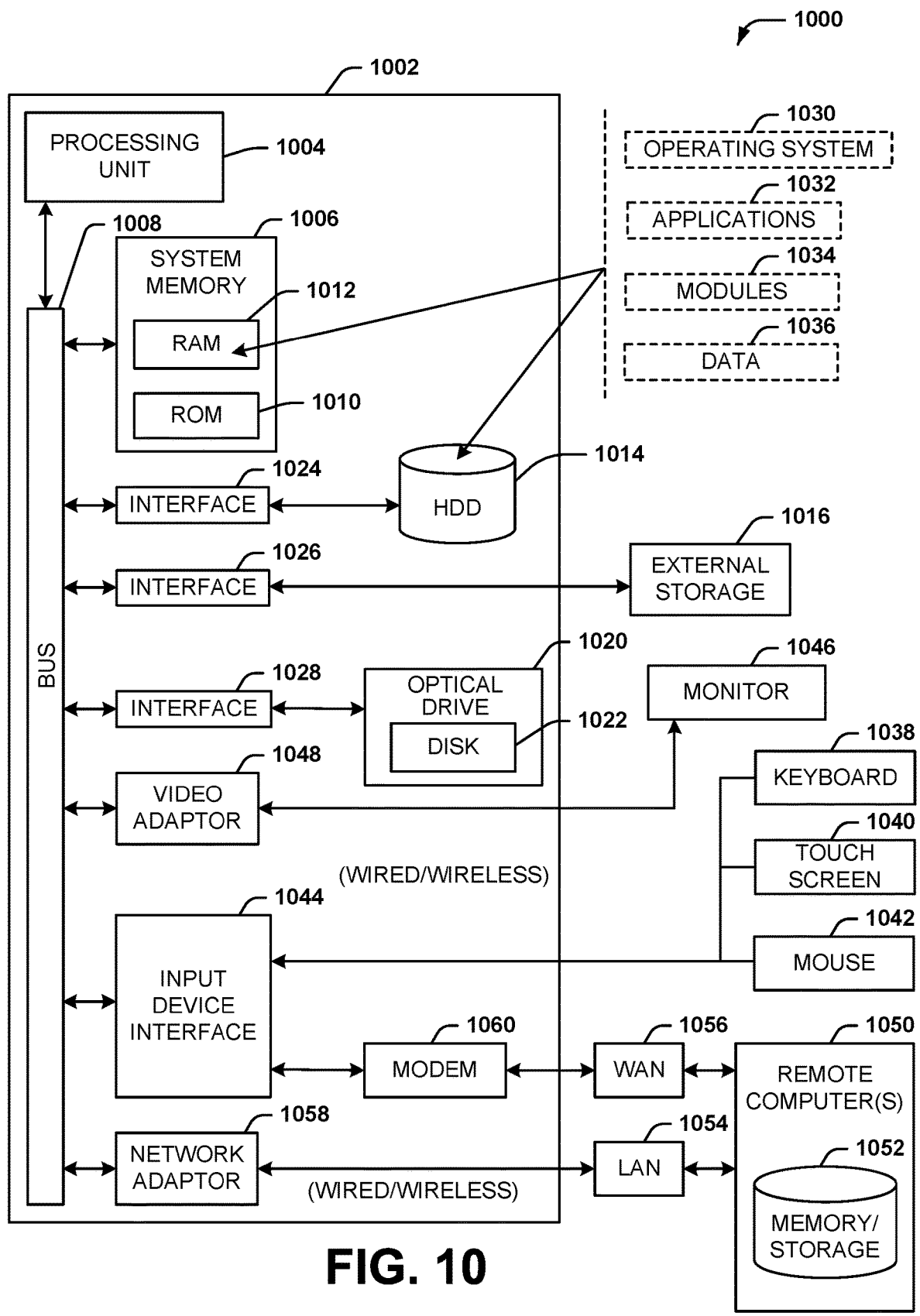
FIG. 10 illustrates a block diagram of an example computer operable to provide any of the various devices described herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors and may include a cache memory. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can comprise a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities.

Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   receiving, by a server comprising a processor, an instruction to open a file from a client;
   in response to the instruction, storing, by the server, the file in a volatile memory;
   allocating, by the server, an identifier to the file in the volatile memory, wherein the identifier is used by a server operating system to identify the file in the volatile memory;
   creating, by the server, a cache key corresponding to the identifier;
   storing, by the server, the cache key and a corresponding pointer in a resource cache, comprising cache keys and corresponding pointers,
   wherein the corresponding pointer points to the identifier; and
   sending, by the server, a wire format resource to the client, wherein the wire format resource comprises the cache key, wherein the server is a cluster server included in a cluster, and wherein the cache key is unique within the cluster of servers.

2. The method of claim 1, wherein the instruction to open the file is included in a remote procedure call.

3. The method of claim 2, further comprising:
   after sending the wire format resource to the client, receiving, by the server, a subsequent remote procedure call from the client, the subsequent remote procedure call comprising the wire format resource and file modification information;
   using, by the server, the cache key from the wire format resource included in the subsequent remote procedure call and the resource cache to retrieve the identifier; and
   modifying, by the server, the file in the volatile memory according to the file modification information, wherein the modifying comprises using the identifier to locate the file in the volatile memory.

4. The method of claim 2, further comprising:
   after sending the wire format resource to the client, receiving, by the server, a subsequent remote procedure call from the client, the subsequent remote procedure call comprising the wire format resource and an instruction to close the file;
   using, by the server, the cache key from the wire format resource included in the subsequent remote procedure call and the resource cache to retrieve the identifier;
   deallocating, by the server, the file in the volatile memory, wherein the deallocating comprises using the identifier to deallocate the file in the volatile memory; and
   removing, by the server, the corresponding pointer from the resource cache.

5. The method of claim 1, wherein the wire format resource is a first wire format resource and the cache key is a first cache key, and further comprising:
   receiving, by the server, a second wire format resource;
   checking, by the server, the resource cache for a second cache key included in the second wire format resource; and
   in response to a result of the checking being that the second cache key is absent from the resource cache, using, by the server, hint information from the second wire format resource to locate data in a shared cluster storage.

6. The method of claim 1, wherein the wire format resource comprises hint information to enable locating the file in a shared cluster storage by a subsequent cluster server in the cluster.

7. The method of claim 1, further comprising evicting, by the server, at least one cache key of the cache keys from the resource cache according to a least recently used eviction protocol.

8. A cluster server, comprising:
   a processor; and
   a memory that stores executable instructions that, when executed by the processor, facilitate performance of operations, the operations comprising:
      establishing a connection with a client device subsequent to a failure of an initial cluster server initially connected to the client device;
      receiving, from the client device via the connection, a remote procedure call comprising a wire format resource initially provided to the client device by the initial cluster server, wherein the wire format resource comprises a cache key and hint information to locate a file initially opened at the initial cluster server;
      using the hint information to open the file, resulting in an opened file;
      allocating an identifier to the opened file, wherein the identifier is used by a cluster server operating system to identify the opened file; and
      storing the cache key and a corresponding pointer in a resource cache, wherein the resource cache comprises cache keys and corresponding pointers, and wherein the corresponding pointer points to the identifier.

9. The cluster server of claim 8, wherein the operations further comprise checking the resource cache for the cache key, and wherein using the hint information to open the file is responsive to a result of the checking being that the cache key is not found in the resource cache.

10. The cluster server of claim 8, wherein opening the file comprises locating the file in a shared cluster storage using the hint information.

11. The cluster server of claim 8, wherein the operations further comprise:
  receiving a subsequent remote procedure call from the client device, the subsequent remote procedure call comprising the wire format resource and file modification information;
  using the cache key from the wire format resource and the resource cache to retrieve the identifier; and
  modifying the opened file according to the file modification information, wherein the modifying comprises using the identifier to locate the opened file.

12. The cluster server of claim 8, wherein the operations further comprise:
  receiving a subsequent remote procedure call from the client device, the subsequent remote procedure call comprising the wire format resource and an instruction to close the file;
  using the cache key from the wire format resource and the resource cache to retrieve the identifier;
  deallocating the opened file in a volatile memory, wherein the deallocating comprises using the identifier to deallocate the file in the volatile memory; and
  removing the corresponding pointer from the resource cache.

13. The cluster server of claim 8, wherein the cache key is unique within a cluster comprising the cluster server and the initial cluster server.

14. The cluster server of claim 8, further comprising evicting, by the cluster server, at least one cache key of the cache keys from the resource cache according to an eviction protocol.

15. A non-transitory machine-readable medium, comprising executable instructions that, when executed by a processor of a cluster server, facilitate performance of operations, the operations comprising:
  sending resource information representative of a first wire format resource to a client device, wherein:
    the first wire format resource comprises a first cache key and first hint information,
    the first cache key corresponds to a first pointer,
    the first cache key and first pointer are stored in a resource cache accessible by the cluster server, and
    the first pointer points to a first identifier used by a cluster server operating system to locate first data in a volatile memory; and
  in response to a first remote procedure call comprising the first wire format resource and a first instruction, using the first cache key and the first pointer in the resource cache to recover the first identifier, in order to perform a first operation on the first data in the volatile memory according to the first instruction.

16. The non-transitory machine-readable medium of claim 15, wherein the operations further comprise, in response to receiving a second remote procedure call comprising second resource information representative of a second wire format resource and a second instruction:
  checking the resource cache for a second cache key included in the second wire format resource;
  in response to a result of the checking being that the second cache key is absent from the resource cache, using second hint information from the second wire format resource to locate second data in a shared cluster storage and loading the second data in the volatile memory;
  allocating a second identifier to the second cache key, wherein the cluster server operating system uses the second identifier to locate the second data in the volatile memory;
  storing the second cache key and a second pointer in the resource cache, wherein the second pointer points to the second identifier; and
  performing a second operation on the second data in the volatile memory according to the second instruction.

17. The non-transitory machine-readable medium of claim 15, wherein the first cache key is unique within a cluster comprising the cluster server.

18. The non-transitory machine-readable medium of claim 15, wherein the operations further comprise in response to determining that the first cache key does not satisfy a recent use criterion, evicting the first cache key from the resource cache.

19. The non-transitory machine-readable medium of claim 15, wherein the operations further comprise, in response to the first instruction comprising an instruction to deallocate the first data, deallocating the first data in the volatile memory and removing the first cache key and the first pointer from the resource cache.

20. The non-transitory machine-readable medium of claim 15, wherein the first hint information comprises a file path or a global unique identifier associated with the first data.

* * * * *